(No Model.)
W. W. & W. A. WILLIAMS.
SOLDERING APPARATUS.
No. 248,376. Patented Oct. 18, 1881.
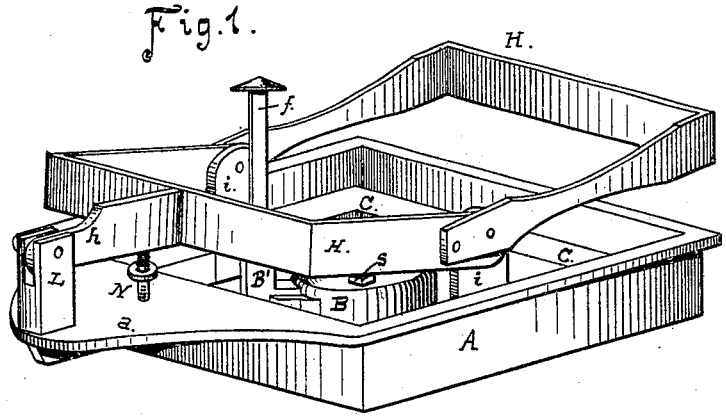
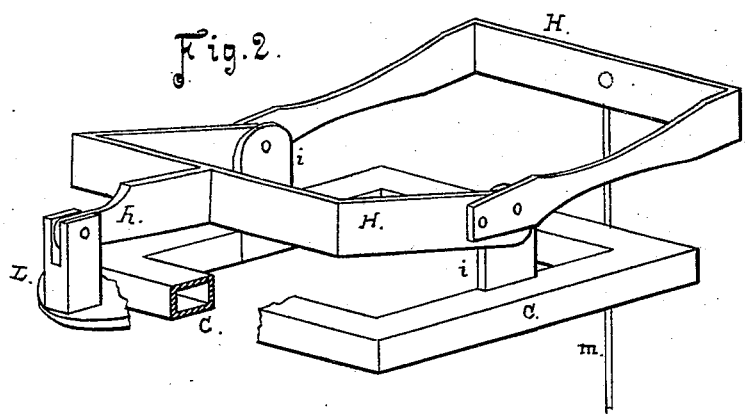
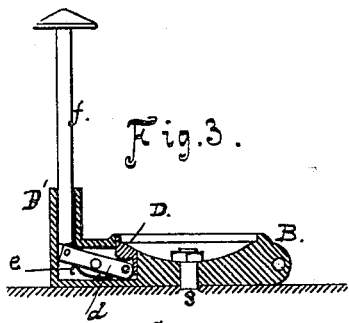
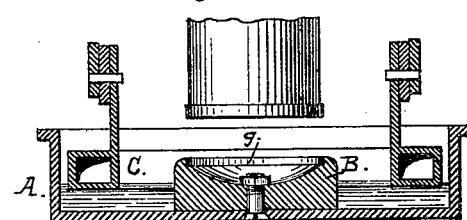
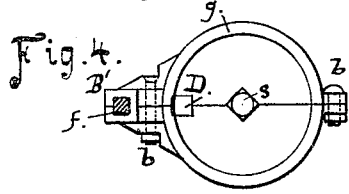
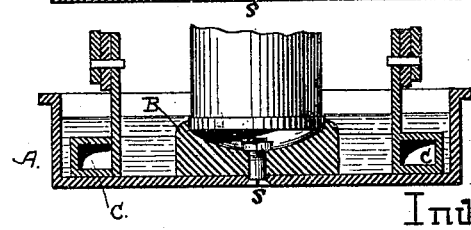
Witnesses:
W. F. Clark
W. Veit
Inventor:
William W. Williams and
Wm. A. Williams
By his Attys., Boone & Osborn

UNITED STATES PATENT OFFICE.

WILLIAM W. WILLIAMS AND WILLIAM A. WILLIAMS, OF SAN FRANCISCO, CALIFORNIA.

SOLDERING APPARATUS.

SPECIFICATION forming part of Letters Patent No. 248,376, dated October 18, 1881.

Application filed May 14, 1881. (No model.)

*To all whom it may concern:*

Be it known that we, WILLIAM W. WILLIAMS and WILLIAM A. WILLIAMS, of the city and county of San Francisco, in the State of California, have made and invented a new and useful Improvement in Soldering Apparatus; and we do hereby declare that the following specification fully and clearly sets forth and describes our said invention and the manner in which the same is employed and operated, reference being had to the accompanying drawings.

Our invention relates to machinery or apparatus for soldering on the bottoms and tops or ends of metal cans in which substances of various kinds and articles of food are put up and preserved.

Our invention consists, mainly, in a fixed supporting-block which is recessed to receive and hold the top or bottom of the can during the soldering process, in combination with a vessel for holding the melted solder and a float or frame which is applied in the said vessel and operated to cause the solder to rise and flow about the joint to be soldered.

The invention also consists in the combination, with the movable frame or float, the fixed holding-die, and the solder-holding pan, of an adjustable stop which will arrest the descent of the float at any desired point, and thus allow the rise of the solder about the joint of the can and its top or bottom to be regulated.

In the drawings herein referred to, Figure 1 shows, in perspective, the several parts of a soldering apparatus constructed in accordance with our invention and ready for use on a suitable furnace to maintain the solder in a molten state. Fig. 2 is a detail view of the float or presser for acting upon the body of solder, and the frame by which it is operated. Fig. 3 is a vertical cross-section through the stationary die or holding plate. Fig. 4 is a plan view of the same. Figs. 5 and 6 are sections taken transversely through the die, the presser-float, and the pan or receptacle containing the solder. The first figure shows the relation and position of the parts when a can is about to be placed in the die for holding it in the operation of soldering, while the second of these figures shows the position of the parts when the surface of the solder is raised up by the pressure and displacing action of the float.

In the apparatus shown in Fig. 1 of the drawings, A represents a shallow pan or receptacle adapted to be placed in the top of or upon a suitable furnace in a level position, so that a quantity of solder placed in it shall be held horizontally or with level surface, and be maintained in a molten state during work. In the center of this pan a fixed die or grooved block, B, receives and fits tightly around the end portion of the can, while a frame or float, C, suspended from a pivoted frame, H, rests upon the body of solder around the fixed die. By pressing down one end of this frame H, either by hand or any other suitable means—as a treadle operating on a rod or pitman, $m$—the presser-float C is caused to displace the solder so that the level thereof shall be raised up over the die and flow around the can at a required distance above the rim, and so run into and close the seam or joint uniformly at all points.

An adjustable stop, N, provided beneath the presser-float frame, regulates and controls the downward movement of the presser-float, and consequently the height to which the surface of the solder shall rise at such time.

In constructing the die or holding block B we find it desirable or necessary to make the groove or recess $g$ of the exact size of the cans to be operated on, so that a slight pressure is required to force the can into and fix it in position in the groove, for by this means we not only press and close the parts of the joint or seam tightly and uniformly together all around the rim or edge of the can, but we also prevent the solder from running in between the edge of the die and the can-body and coming in contact with its bottom or end. These dies B are therefore made to conform exactly in shape and size of groove $g$ with the kind of can or vessel to be soldered, and in changing the work from cans of one shape or size to those of another it will be necessary only to substitute a die of the proper shape and size. For this purpose the die is secured in place by a bolt and nut, S, so that the proper die can be adjusted in place before starting the furnace. In making this die to fit and bind around the rim of the can it will be necessary to provide some means for loosening or discharging the can from the groove after the soldering is performed, as otherwise the parts would be separated or the seam opened in attempting to draw out the can by hand. For this purpose, therefore, we place at one side, in the rim of the groove $g$, a small bolt or trigger, D, having a short up-and-down movement imparted to it at the proper times by an upright stem, $f$, working in a socket, B', on the side of the die and acting on one end of a pivoted lever, $d$, which is attached at its other end to the trigger D.

For throwing the stem upward and bringing down the trigger D, a spring, $e$, may be employed beneath the end of the stem $f$ to throw it up when pressure is removed from the head $f'$. For convenience in inserting and fixing this trigger and parts we have shown the die B as being made in two sections, secured together by bolts $b\ b$; but we do not confine ourselves to this particular construction, as such trigger or loosening device can be applied in several ways to operate in this manner and eject or throw the can out of the groove.

The float or device by which the solder is displaced and the surface caused to rise in the pan is made of a rectangular tubular frame, C, suspended from a pivoted frame, H. It is sufficiently light or buoyant to rest on the surface of the solder, and it is made of the required size to bring the solder up to the required height around the fixed die when pressed down into the molten metal. The frame H is pivoted at the front end in an upright post, L, supported by the bracket $a$, projecting from the side of the pan A, and it is bolted or fastened at the sides to the upright lugs $i\ i$, projecting from the top of the float C. This frame and float should not be heavy enough to press or bear too much upon the surface of the solder, as it is preferable to have the float just rest or float, as it were, on the molten solder. To regulate the extent of its downward movement we provide beneath the extension $h$ of the frame H an adjustable stop, N, consisting of a screw working in a nut or bearing in the bracket $a$, and movable up and down, to be set so that it shall strike against the arm $h$ of the frame H and arrest it sooner or later in its downward movement, as desired. The adjustability of this stop is required to make the surface of the solder rise up to the same height or level at all times during the working of the machine, and as the quantity of solder becomes reduced in the pan the operator will shorten the stop N, and thus lower the float C as fast as the solder is consumed.

By this construction the solder is mechanically applied always at the same height or to the same line around the can, so that a clean joint is produced and the sides of the can are not disfigured or the solder wasted.

The advantages derived from the use of our improvement are that the cans are fixed and held in a stationary position and always in the same relation to the surface of the solder when it is brought up and applied to the joint. The height to which it is desired to apply the solder is always under perfect control and adjustment, and the solder cannot be applied unevenly, or higher upon one side than the other, when the apparatus is once set on a level, and a great variety of work can be performed in it by the simple substitution of one form of die for another.

Having thus fully described our invention, what we claim, and desire to secure by Letters Patent, is—

1. The combination, in a machine for soldering on the ends of cans, of the fixed supporting-block having a recess adapted to receive and tightly hold the can top or bottom around its rim or edge, the vessel for holding solder, and a frame or float for causing the solder to rise and flow around the joint between the body of the can and its top or bottom, substantially as described.

2. In combination with a pan or receptacle to contain a body of solder in a molten plate, a fixed holding plate or die, B, having the discharging-trigger for the purpose stated, and a means for mechanically displacing the solder at intervals and causing its surface to rise to and to uniformly flow around the top of said die, substantially as described.

3. The combination, in a soldering-machine, of a solder-holding pan, a fixed holding-block for the can top or bottom arranged therein, the movable pressure float, and an adjustable stop for regulating the amount of descent of the float in the fluid solder and the rise of the solder about the joint between the can-body and its top or bottom, substantially as described.

4. In a soldering-machine, the solder pan or receptacle A and the stationary die B, in combination with the hinged pressure-float C H and the adjustable stop N, as means for controlling the vertical movement of the float, substantially as described.

5. In combination with the hinged frame H, the suspended hollow float C, and the adjustable stop N beneath the frame H, substantially as described.

6. In a soldering apparatus, the combination of the die B and the discharging device consisting of the trigger D, lever $d$, and rod $f$, substantially as shown and described.

In witness that we claim the foregoing we have hereunto set our hands and seals.

WM. W. WILLIAMS. [L. S.]
WM. A. WILLIAMS. [L. S.]

In presence of—
E. H. THORP,
WM. F. CLARK.